Figure 1:
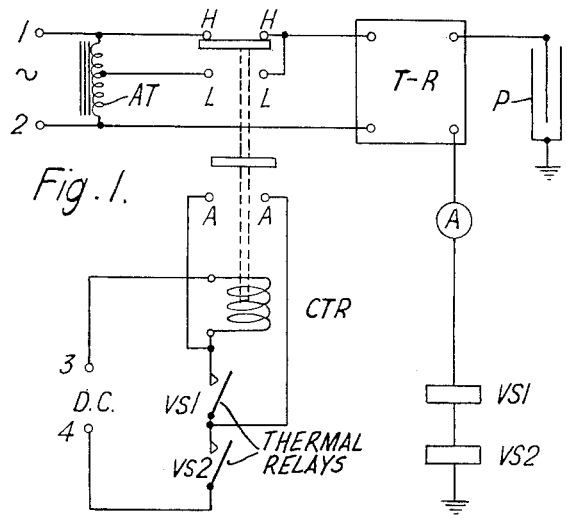

Aug. 22, 1961

N. C. BROOKS 2,997,642

ELECTRICITY SUPPLY EQUIPMENT FOR
ELECTRICAL PRECIPITATION PLANT

Filed June 27, 1957

Inventor
N. C. Brooks
By
Attorney though its efficiency would, in the absence of a regulator,

United States Patent Office 2,997,642
Patented Aug. 22, 1961

2,997,642
ELECTRICITY SUPPLY EQUIPMENT FOR ELECTRICAL PRECIPITATION PLANT
Norman Colston Brooks, London, England, assignor to International Standard Electric Corporation, New York, N.Y., a corporation of Delaware
Filed June 27, 1957, Ser. No. 668,512
Claims priority, application Great Britain July 4, 1956
2 Claims. (Cl. 323—1)

This invention relates to electricity supply equipment for an electrical precipitation plant, particularly that used for cleaning gas emerging from a gas generating plant.

Electrical precipitation arrangements for removing tar-fog and other suspended impurities from gas are well-known, but all suffer from the inherent defect that as the gas flow increases, bringing with it an increasing concentration of suspended impurity particles, so also does the inter-electrode resistance, with a corresponding reduction of discharge current. This is the opposite of what is required, since the precipitation efficiency decreases with decrease of discharge current, whereas it is required to increase with increasing gas flow. This is particularly important in gas generating plants operating on a cyclic process where the gas is generated only during a prescribed portion of an operating cycle, and thus comes off intermittently, the precipitation process being preferably applied before the gas passes to a storage gas holder which smooths out the uneven flow.

Arrangements are therefore desirable in such plants for effecting a compensation of the electrode current in accordance with gas flow, not only to improve precipitation efficiency at the maximum flow point of the cycle, but also to improve electrical efficiency by reducing the standing current losses to a minimum during the quiescent portion of the cycle.

In British Patent No. 724,068, such arrangements are described linked to a mechanical "operator" which controls the valves which define the gas cycle, the arrangements comprising an electrical regulator of one of several well-known forms which acts to control the voltage applied to the precipitator so as to maintain a discharge current substantially proportional to the rate of gas flow.

It has now been found possible to link the regulator electrically with the discharge current rather than mechanically with the "operator," and according to the present invention here is provided, in an electrical precipitation plant for gas cleaning, automatically operating means for varying the high tension voltage applied to the discharge electrodes in inverse response to variations in the precipitator discharge current flowing.

The invention will be particularly described with reference to the accompanying drawing which shows, in FIG. 1, an electrical controlling circuit for a high-voltage electric precipitator; in FIG. 2, wave-forms relative to gas-flow and precipitator current in a cyclic gas generator; and in FIG. 3, relay operations associated with the gas cycle.

In modern plants for the cyclic production of carburetted water gas, the gas making cycle is automatically controlled by one form or another of mechanical gas operator, so that for a given period (the blow period) air is blown through the coke bed, thus producing exothermic reactions whereby the coke bed is heated to incandescence, and then for another given period (the run period) steam is blown through the coke bed to generate blue water gas by an endothermic reaction. For a short time during the run period, oil is admitted into the carburettor, where it is cracked to enrich the blue water gas with hydrocarbons of high calorific value. Fuel gas is not produced during the blow period, but only during the run period and the gas production reaches a peak during the oiling period. These successive operations (and further and more complex procedures, which will not be described here as they are well-known practice) are effected actuating the appropriate valves by means of mechanical or hydraulic control gear of well-known type, ultimately timed by means of a cam shaft driven by an electric motor, such control gear being known as an "operator." The cam shaft makes one complete revolution during each complete cycle of gas making operations, taking a few minutes, the cycle being repeated indefinitely.

As stated earlier, the generated gas is cleaned on its way to the gas holders by an electrical precipitation plant whose efficiency will, in the absence of a regulator, would vary inversely with the rate of gas flow, contrary to requirements. By means to be described hereafter, which comprise essentially a change-over contactor actuated by current-sensitive relays in the direct current circuit of the associated high-tension transformer-rectifier equipment, the current passing between the precipitator electrodes is automatically switched to a predetermined maximum during that part of the cycle when gas is flowing and therefore the electrical resistance is greatest, thereby ensuring efficient precipitation of suspended impurities, while the current is caused to fall to a low value when the gas flow is negligible so that very little electrical power is wasted during this part of the cycle. When the gas flow next increases the electrical output is again automatically stepped up, and so on indefinitely. No electrical or mechanical connection with the operator is required.

All components of the controller may be mounted in a sheet steel housing which may be fitted to new or existing transformer-rectifier equipments.

Figure 2:
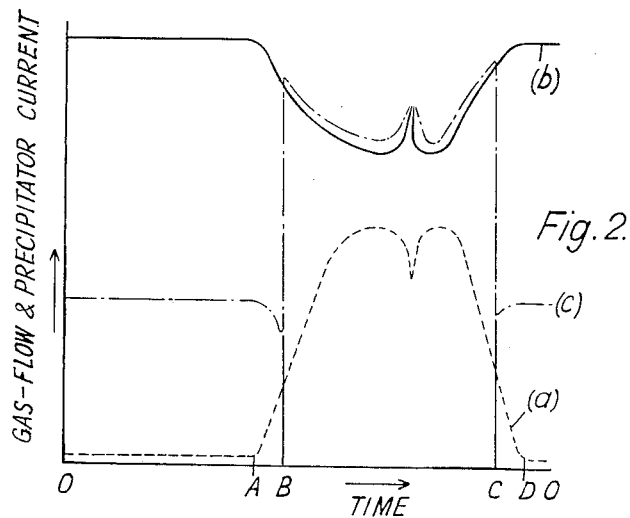

Referring first to FIG. 2, the dotted line curve (*a*) shows the fluctuations in gas flow (at the precipitator) which normally occur during one operating cycle of one gas generator. It will be seen that from O to A, and from D back to O, corresponding to the "blow" period, there is no gas production, a period which occupies approximately half of the cycle. The "run" period, from A to D, shows a sharp rise in production, with a pronounced "dimple" at about half-way, caused by a temporary stoppage in gas production while the direction of steam flow is being reversed, followed by a fall to the original value at A, all in accordance with normal practice. The full line curve (*b*) shows the corresponding precipitator current in the absence of external control, and it will be seen that this current follows faithfully, in reverse, the curve of gas flow. The chain-dotted line curve (*c*) shows the current discharge which is obtained when a controller in accordance with the present invention is employed to regulate the voltage applied to the precipitator, from which it will be seen that the discharge current is maintained substantially at one or other of two predetermined values.

Referring now to FIG. 1, this shows the basic electrical circuit of a suitable controller.

An auto-transformer AT is connected to input terminals 1, 2, for connection to an alternating current supply circuit (not shown), while the output terminals of the auto-transformer are connected to a transformer and rectifier unit T-R for the supply of high tension power to a gas-cleaning precipitator P. As shown, the output connection from one end of the auto-transformer is taken via contacts H of a contactor CTR, while a lower output tapping of the auto-transformer is connected to one of another pair of terminals L of the contactor for supplying the transformer-rectifier at a lower voltage. The precipitator is indicated as comprising a central high-voltage electrode connected to one output terminal of T-R, and an outer casing connected to ground. The other output terminal of T-R is also grounded via an ammeter A and a pair of vacuum switch type thermally-operated relays VS1 and VS2, all in series.

The contactor coil-operating circuit is supplied from a low-voltage direct current supply circuit (not shown) at terminals 3, 4, via break contacts *vs*1 and *vs*2 of their respective relays VS1 and VS2. In addition, *vs*1 are bridged by auxiliary contacts A of the contactor which are connected together when the contactor is switched to the "low" position.

Figure 3:
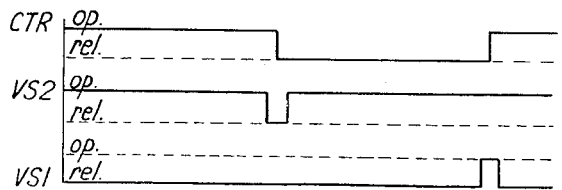

Relays VS1 and VS2 operate as marginal relays to the precipitator discharge current, VS1 being set to operate only to high values of current, while VS2 is set to release at a certain low value of current: these conditions are indicated in FIG. 3.

The operating sequence for one complete cycle of the equipment is as follows:

During the time interval O—A, VS2 is operated; VS1 is not operated, but CTR is operated, i.e. with contacts L and A closed, as a condition left from the previous cycle, and is maintained operated over contacts A. Gas flow is virtually zero, and I-D.C., the precipitator discharge current, is steady at a low value.

At A, gas flow commences to increase, and with it, the inter-electrode resistance, causing I-D.C. to drop in value so that at B, VS2 releases. This opens the hold circuit of CTR, which thereupon releases, opening contacts A and L, and closing contacts H, so applying a high voltage to the precipitator, VS2 reoperates but VS1 does not, at this current.

From B to C, I-D.C. is left uncontrolled and varies inversely with gas flow, and thus follows the curve (*b*) closely.

At C, I-D.C. tends towards a very high value as the gas flow is reduced, so that VS1 closes. The circuit for operating CTR is thus completed. CTR operates, changing over the H and L contacts and causing a low voltage to be applied to T-R, and also closing contacts A to hold the contactor operated when VS1 releases to the new, low value of I-D.C. VS2 remains closed.

From C to D, the gas flow finally falls to its minimum value for the cycle and I-D.C. increases to its steady, quiescent value, which persists from D to O, and then from O to A, as formerly described.

Relays VS1 and VS2 are, by their nature as thermal relays, sluggish in their operation, a characteristic which prevents any risk of faulty operation in the conditions described above.

It will be observed that the simple, two position relay arrangement described affords no control of the precipitator current during gas flow. This, however, is regarded as of no consequence, since gas-cleaning efficiency is not thereby greatly affected, while the standing current between the successive "run" periods is suitably low.

The simple controlling arrangements, moreover, being directly related to the actual gas flow, are equally effective whether the plant comprises a single gas generator or a plurality of generators, working in staggered, parallel relationships, and no modifications to the controller are necessary to allow for this.

It should be pointed out that the circuit arrangements shown have been purposely simplified to demonstrate the functioning of the equipment more clearly.

For instance, the auto-transformer shown might be provided with a plurality of tappings at both ends, both on the input and the output sides, to permit of fine adjustments in the voltages to which the equipment is initially set. Such selection could be switch controlled.

Further, the direct current supply shown would almost certainly be derived by rectification from the incoming alternating current, possibly via a low voltage tapping of the auto-transformer.

Again, the contactor may be operated, not directly, as shown, but via an auxiliary relay having two pairs of contacts, one pair for closing the contactor circuit and a second pair, optionally, for performing the function of the contactor A contacts. The auxiliary relay would occupy the position shown in FIG. 1 for the contactor winding CTR.

These, and other minor practical details, form no part of the invention.

Finally, although only two voltage levels have been indicated for operating the precipitator, it is within the scope of the invention to provide a plurality of levels and the corresponding plurality of marginally operating relays to control them; but such complication is not in general necessary, the simple scheme described being adequate.

While we have described above the principles of our invention in connection with specific apparatus, it is to be clearly understood that this description is made only by way of example and not as a limitation to the scope of our invention, as set forth in the objects thereof and in the accompanying claims.

What is claimed is:

1. A regulator for controlling the discharge current of the high tension supply for a continuous precipitation process in a gas generating plant whereby the value of the discharge current flowing through the precipitator during the blow period of said process is reduced substantially below the value of the discharge current flowing during the run period comprising: a first voltage source and a second voltage source of reduced value; switching means for connecting said first voltage source to said high tension supply during the run period and said second voltage source to said high tension supply during the blow period; and control means including marginal relay means operating in response to predetermined values of said discharge current connected between said high tension supply and said switching means to connect said high tension supply selectively to one or the other of said voltage sources, comprising a first relay and a seocnd relay, the first relay operating to cause the switching means to connect said high tension supply to said first voltage source when the discharge current tends to fall below a predetermined value, the second relay operating to cause the switching means to connect said high tension supply to said second voltage source of reduced value when the discharge current tends to exceed a predetermined value.

2. A regulator according to claim 1 wherein said first and second relays are thermal relays.

References Cited in the file of this patent

UNITED STATES PATENTS

| | | |
|---|---|---|
| 2,189,606 | King | Feb. 6, 1940 |
| 2,239,768 | Artzt | Apr. 29, 1941 |
| 2,449,456 | Croco | Sept. 14, 1948 |
| 2,721,969 | Van Ryan et al. | Oct. 25, 1955 |

FOREIGN PATENTS

| | | |
|---|---|---|
| 724,068 | Great Britain | Feb. 16 1955 |